(12) United States Patent
Lung

(10) Patent No.: US 8,854,537 B2
(45) Date of Patent: Oct. 7, 2014

(54) CAMERA MODULE

(75) Inventor: Chien-Lih Lung, Tu-Cheng (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 3 days.

(21) Appl. No.: 12/981,533

(22) Filed: Dec. 30, 2010

(65) Prior Publication Data

US 2011/0292279 A1    Dec. 1, 2011

(30) Foreign Application Priority Data

May 31, 2010  (TW) ................. 99117335 A

(51) Int. Cl.
*H04N 5/225* (2006.01)
(52) U.S. Cl.
CPC ................... *H04N 5/2252* (2013.01)
USPC ........................................... 348/374

(58) Field of Classification Search
USPC ....... 438/64, 69; 250/234; 257/433; 348/340, 348/374
See application file for complete search history.

(56) References Cited

U.S. PATENT DOCUMENTS

| | | | |
|---|---|---|---|
| 2002/0154239 A1* | 10/2002 | Fujimoto et al. | 348/340 |
| 2002/0181034 A1* | 12/2002 | Miyake et al. | 358/514 |
| 2005/0012024 A1* | 1/2005 | Hsieh et al. | 250/208.1 |
| 2007/0241273 A1* | 10/2007 | Kim et al. | 250/239 |
| 2008/0284897 A1* | 11/2008 | Lv | 348/340 |
| 2009/0109326 A1* | 4/2009 | Christison | 348/374 |
| 2009/0122177 A1* | 5/2009 | Murakami | 348/340 |

* cited by examiner

*Primary Examiner* — Mekonnen Dagnew
(74) *Attorney, Agent, or Firm* — Novak Druce Connolly Bove + Quigg LLP

(57) ABSTRACT

A camera module includes a lens of heat-resistant material, a barrel receiving the lens, a baseboard mounted on the barrel by surface mounted technology, an image sensor mounted on the baseboard receiving optical signals from the lens and converting the optical signals into electrical signals, and a transmitting member transmitting the electrical signals to the circuit board.

10 Claims, 1 Drawing Sheet

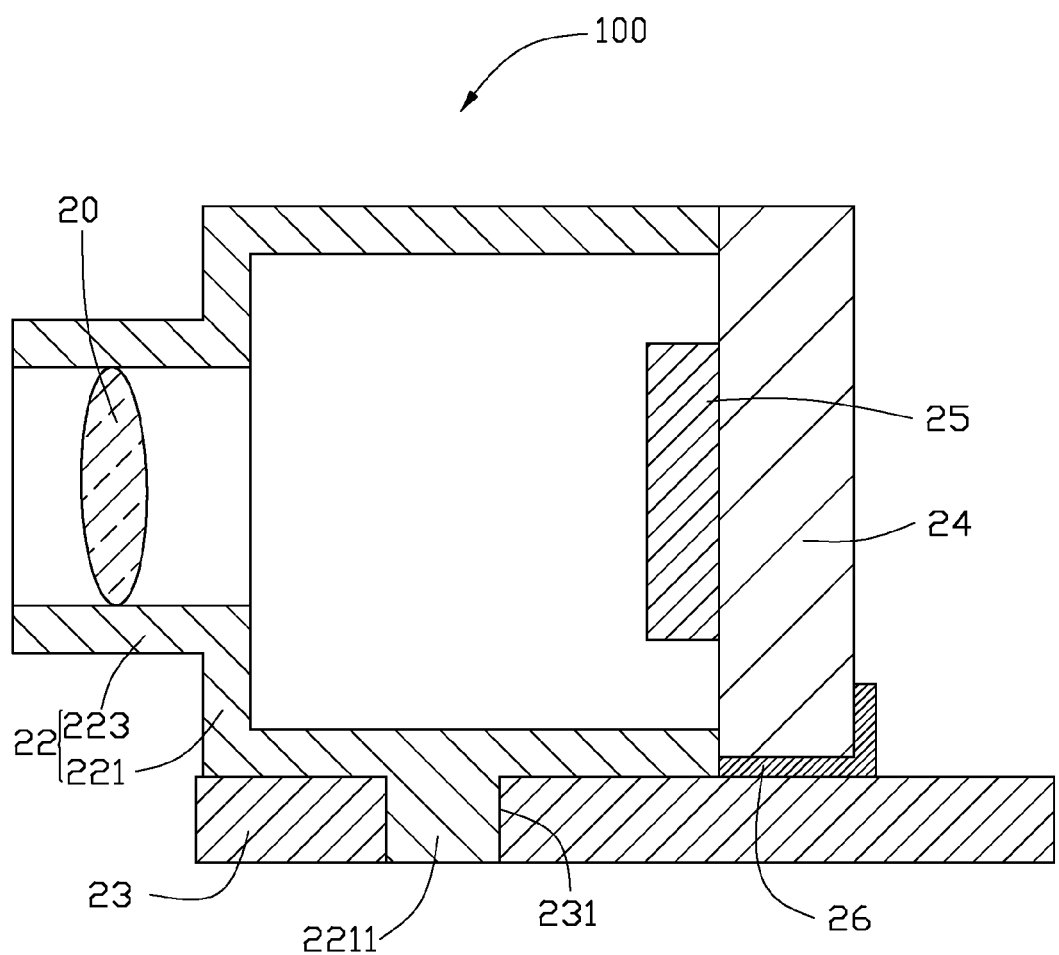

CAMERA MODULE

BACKGROUND

1. Technical Field

The present disclosure relates generally to camera modules, and especially to a camera module with lens.

2. Description of Related Art

Commonly used lenses for camera modules are often not heat-resistant, and often include a housing thereon for mounting the camera module on a circuit board by surface mounted technology. However, the housing increases the volume of the camera module.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

The FIGURE is a cross section of one embodiment of an electronic device.

DETAILED DESCRIPTION

Referring to FIGURE, an embodiment of the camera module 100 includes a lens 20, a barrel 22 for receiving the lens 20, a circuit board 23 and baseboard 24, an image sensor 25, and a transmitting member 26. The lens 20 is made of heat-resistant polymeric material. In the illustrated embodiment, the lens 20 is made of polymethyl methacrylate (PMMA).

The barrel 22 includes a main body 221 and a circular mounting portion 223 formed on the main body 221. The mounting portion 223 is used for mounting the lens 20 therein. A diameter of the mounting portion 223 is less than that of the main body 221. The main body 221 forms a positioning post 2211 at a side surface of the main body 221 for fixing the barrel 22 on the circuit board 23. In the illustrated embodiment, the barrel 22 is made of liquid crystal polyester (LCP), with a melting point exceeding 260° C.

The circuit board 23 defines a fixing hole 231 receiving the positioning post 2211 of the barrel 22. The baseboard 24 is also a circuit board, used for transmitting signals from the image sensor 25. The image sensor 25 converts optical signals from the lens 22 into electrical signals, and may be a charge coupled device (CCD) or a complementary metal oxide semiconductor (CMOS). The transmitting member 26 can be an L-shaped sheet for transmitting electrical signals to the circuit board 23. The transmitting member 26 is directly mounted at a corner of the baseboard 24 and partially surrounds the corner of the baseboard 24, thus the transmitting member 26 can be easily mounted using solder.

In assembly, the lens 20 is mounted in the mounting portion 223, the image sensor 25 is mounted on the baseboard 24 by surface mounted technology (SMT). The baseboard 24 is mounted on an end of the main body 221 of the barrel 22 away from the receiving portion 223. The main body 221 is mounted on the circuit board 23 by SMT, and the positioning post 2211 is received in the fixing hole 231 of the circuit board 23. The transmitting member 26 is also mounted on the circuit board 23 by SMT, and connected to the baseboard 24 to transmit electronic signals to the circuit board 23, and finally forming an image. The circuit board 23 is directly mounted on a side surface of the barrel 22, substantially parallel to an optical axis of the lens 20, minimizing the volume of the camera module 100. The lens 20 and the barrel 22 are made of heat-resistant materials, thus the barrel 22 can be easily mounted on the circuit board 23 directly by SMT.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A camera module comprising:
   a lens made of heat-resistant material and having an optical axis;
   a barrel for receiving the lens, the barrel having a first barrel end, a second opposite barrel end, and a straight longitudinal axis passing through the first barrel end and second barrel end, the lens received in the barrel at the first barrel end with the optical axis of the lens coaxial with the longitudinal axis of the barrel;
   a baseboard mounted to the second barrel end by surface mount technology;
   an image sensor mounted on the baseboard receiving optical signals from the lens and converting the optical signals into electrical signals;
   a circuit board is directly mounted on a side surface of the barrel; and
   a discrete transmitting member physically between and contacting both and interconnecting the baseboard and the circuit board and transmitting the electrical signals to the circuit board;
   wherein the circuit board is substantially parallel to the optical axis of the lens and the longitudinal axis of the barrel and perpendicular to the baseboard and the image sensor.

2. A camera module comprising:
   a lens made of heat-resistant material;
   a barrel for receiving the lens;
   a baseboard mounted on the barrel by surface mount technology;
   an image sensor mounted on the baseboard receiving optical signals from the lens and converting the optical signals into electrical signals;
   a circuit board is directly mounted on a side surface of the barrel; and
   a discrete transmitting member physically interconnecting the baseboard and the circuit board and transmitting the electrical signals to the circuit board;
   wherein the circuit board is substantially parallel to an optical axis of the lens;
   wherein the barrel forms a positioning post, and the circuit board defines a fixing hole receiving the positioning post; and
   wherein the barrel comprises a main body and a mounting portion formed on the main body for mounting the lens, and the positioning post is formed on a side surface of the main body.

3. The camera module of claim 2, wherein the lens is made of polymethyl methacrylate.

4. The camera module of claim 2, wherein the image sensor is a charge coupled device.

5. The camera module of claim 2, wherein the image sensor is a complementary metal oxide semiconductor.

6. The camera module of claim 2, wherein the transmitting member is an L-shaped sheet, the transmitting member is directly mounted at a corner of the baseboard and partially surrounds the corner of the baseboard.

7. The camera module of claim 6, wherein the baseboard is a second circuit board.

8. The camera module of claim 2, wherein the barrel is made of liquid crystal polyester.

9. The camera module of claim 2, wherein the barrel comprises a main body and a mounting portion formed on the main body for mounting the lens, and the baseboard is mounted on an end of the main body away from the mounting portion.

10. The camera module of claim 2, wherein the circuit board is physically separated from the baseboard.

* * * * *